United States Patent
Farrell et al.

(10) Patent No.: US 11,684,148 B2
(45) Date of Patent: Jun. 27, 2023

(54) PERSONAL CARE DEVICE WITH HIGH PRESSURE INDICATOR

(71) Applicant: KONINKLIJKE PHILIPS N.V., Eindhoven (NL)

(72) Inventors: Nathan Farrell, Kirkland, WA (US); Vincent Jeanne, Migne Auxances (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 539 days.

(21) Appl. No.: 16/754,484

(22) PCT Filed: Oct. 10, 2018

(86) PCT No.: PCT/EP2018/077618
§ 371 (c)(1),
(2) Date: Apr. 8, 2020

(87) PCT Pub. No.: WO2019/072925
PCT Pub. Date: Apr. 18, 2019

(65) Prior Publication Data
US 2020/0390228 A1 Dec. 17, 2020

Related U.S. Application Data (60) Provisional application No. 62/571,854, filed on Oct. 13, 2017.

(51) Int. Cl.
*A46B 15/00* (2006.01)
*A46B 5/00* (2006.01)
(Continued)

(52) U.S. Cl.
CPC ......... *A46B 15/004* (2013.01); *A46B 5/0033* (2013.01); *A46B 13/02* (2013.01);
(Continued)

(58) Field of Classification Search
CPC ..... A46B 15/004; A46B 5/0033; A46B 13/02; A46B 15/0044; A46B 15/0046; A61C 17/34
See application file for complete search history.

(56) References Cited

U.S. PATENT DOCUMENTS 5,146,645 A   9/1992   Dirksing
5,355,544 A   10/1994   Dirksing
(Continued)

FOREIGN PATENT DOCUMENTS

CN   201524150 U   7/2010
CN   202173010 U   3/2012
(Continued)

OTHER PUBLICATIONS

International Search Report and Written Opinion, International Application No. PCT/EP2018/077618, dated Jan. 22, 2019.
(Continued)

*Primary Examiner* — Shay Karls (57) ABSTRACT

A personal care device (10) configured to generate a feedback signal in response to excessive pressure applied by a user includes: a body portion (12) comprising a first interacting portion (40); a shaft (24) comprising a second interacting portion (42), wherein the shaft and the second interacting portion are moveable, in response to a force applied by the user, from a first position in which the first interacting portion does not physically interact with the second interacting portion, to a second position in which the first interacting portion physically interacts with the second interacting portion; and a sensor (70) configured to detect the physical interaction between the first interacting portion and the second interacting portion, and further configured to
(Continued)

activate a feedback signal, in response to the detection of the physical interaction, to the user that excessive pressure is being applied.

14 Claims, 9 Drawing Sheets

(51) Int. Cl.
    *A46B 13/02* (2006.01)
    *A61C 17/34* (2006.01)
(52) U.S. Cl.
    CPC ...... *A46B 15/0044* (2013.01); *A46B 15/0046* (2013.01); *A61C 17/34* (2013.01); *A46B 2200/1066* (2013.01)

(56) References Cited

U.S. PATENT DOCUMENTS

| | | | |
|---|---|---|---|
| 5,467,494 A | 11/1995 | Muller et al. | |
| 5,502,861 A | 4/1996 | Spieler et al. | |
| 5,815,872 A * | 10/1998 | Meginniss, III | A61C 17/222 15/105 |
| 6,954,961 B2 * | 10/2005 | Ferber | A61C 17/22 15/105 |
| 7,383,603 B2 | 6/2008 | Edwards | |
| 8,544,131 B2 * | 10/2013 | Braun | A46B 15/0008 15/105 |
| 9,402,463 B2 | 8/2016 | Schmalhurst et al. | |
| 10,449,014 B2 * | 10/2019 | Feine | A61C 17/20 |
| 2003/0115693 A1 * | 6/2003 | Grez | A61C 17/34 15/22.1 |
| 2005/0015906 A1 | 1/2005 | Baglieri | |
| 2012/0251975 A1 | 10/2012 | Iwahori | |
| 2016/0081778 A1 | 3/2016 | Hwang | |
| 2016/0343270 A1 | 11/2016 | Zheng | |
| 2018/0214257 A1 | 8/2018 | Deane | |

FOREIGN PATENT DOCUMENTS

| | | | | |
|---|---|---|---|---|
| EP | 523057 B1 | 4/1995 | | |
| JP | H09322824 A | 12/1997 | | |
| KR | 2015006787 A | 1/2015 | | |
| WO | WO-2016055925 A1 * | 4/2016 | ........... | A46B 15/004 |
| WO | 2017017541 A1 | 2/2017 | | |
| WO | 2017139256 A1 | 8/2017 | | |

OTHER PUBLICATIONS

Slocum, J., "Design and Modeling of a Force Sensitive Toothbrush by Using a Buckling Truss Structure", Massachusetts Institute of Technology, Jun. 2014.

\* cited by examiner

PERSONAL CARE DEVICE WITH HIGH PRESSURE INDICATOR

This application is the U.S. National Phase application under 35 U.S.C. § 371 of International Application No. PCT/EP2018/077618, filed on 10 Oct. 2018, which claims the benefit of U.S. Provisional Application No. 62/571854, filed 13 Oct. 2017. These applications are hereby incorporated by reference herein.

FIELD OF THE INVENTION

The present disclosure is directed generally to a method and system for detecting and indicating the application of excessive pressure during use of a personal care device.

BACKGROUND

More personal care devices are now powered by means of a battery, motor, or other electrical power source to provide improved operational efficiency and ease of use. Although regular use of these devices can lead to positive outcomes for the user, there are hazards associated with improper use of the devices. For example, users electrical versions of personal care devices must use care not to apply excessive pressure when applying the bristles or other cleaning implement to the user's body. Excessive pressure can lead to tissue abrasion and other injury to the body part to which the device is applied.

To avoid excessive pressure, some electronic cleaning devices have been implemented with a pressure sensor. When excessive pressure is detected above a predetermined threshold, the pressure sensor activates an auditory, visual, and/or tactile alert to the user, which causes the user to lessen the pressure. Current implementations of pressure sensors mechanisms convert the user's mechanical cleaning force or load into an electrical signal. The electrical signal is in turn converted into a visual indicator such as a light, a tactile signal such as modulation of the main drive frequency or a separate mechanical haptic system, and/or an auditory signal such as a modulation of the main drive frequency or activation of a speaker, buzzer, or other system. Other implementations reduce drive power until the pressure condition is relieved.

However, the components required to implement pressure sensor and alert mechanisms, such as a sensor, electrical switch, microprocessor, speaker, LED light, and/or other components, can make the implementation of pressure sensing systems in personal care devices not practical due to cost constraints.

Accordingly, there is a need for personal care devices that utilize affordable systems to detect and indicate the application of excessive pressure during use of a personal care device.

SUMMARY OF THE INVENTION

The present disclosure is directed to inventive personal care devices configured to alert a user that they are applying excessive pressure when operating the device. Applied to an electric or power personal care device such as, for example, an electric toothbrush, face cleaner, or shaver, the inventive systems provide a sensor and/or structure configured to provide feedback alerting a user to an excessive pressure condition. According to an embodiment, the personal care device is configured such that at least a portion of the device is flexible in a predetermined magnitude and direction such that when a force is applied to the device, the device creates a feedback alert. For example, a portion of the head member of the personal care device may physically interact with a portion of the body to create feedback. According to an embodiment, the personal care device may utilize existing sensors to detect excessive pressure.

Generally in one aspect is, a personal care device configured to generate a feedback signal in response to excessive pressure applied by a user. The personal care device includes: (i) a body portion comprising a first interacting portion; (ii) a shaft comprising a second interacting portion, wherein the shaft and the second interacting portion are moveable, in response to a force applied by the user, from a first position in which the first interacting portion does not physically interact with the second interacting portion, to a second position in which the first interacting portion physically interacts with the second interacting portion; and (iii) a sensor configured to detect the physical interaction between the first interacting portion and the second interacting portion, and further configured to activate a feedback signal, in response to the detection of the physical interaction, to the user that excessive pressure is being applied.

According to an embodiment, the second interacting portion extends from the shaft into an interior region of the body portion, and wherein the first interacting portion extends into an interior region of the body portion.

According to an embodiment, the body portion comprises a drivetrain configured to oscillate the shaft, and wherein the sensor is configured to detect a change in the oscillation of the shaft as a result of the physical interaction between the first interacting portion and the second interacting portion, said change in oscillation indicating that excessive pressure is being applied by the user. According to an embodiment, the drivetrain is mounted relative to the body portion to be moveable to move the second interacting portion from the first position to the second position in response to the force applied by the user. According to an embodiment, the device includes a flexible attachment mechanism connecting the drivetrain to the body portion such that the drivetrain is moveable relative to the body portion.

According to an embodiment, the first interacting portion and the second interacting portion are internal to the drivetrain.

According to an embodiment, at least a portion of the body portion is flexible relative to the shaft to allow movement of the first interacting portion from the first position to the second position in response to the force applied by the user.

According to an embodiment, the sensor is configured to detect the physical interaction between the first interacting portion and the second interacting portion as a change in current draw by the drivetrain.

According to an embodiment, the sensor is an accelerometer configured to detect the physical interaction between the first interacting portion and the second interacting portion as a change in magnitude or direction of the velocity of a system component.

In accordance with an aspect is a personal care device configured to generate a feedback signal in response to excessive pressure applied by a user. The device includes: (i) a body portion comprising a first interacting portion; and (ii) a shaft comprising a second interacting portion; where at least a portion of the body portion is flexible relative to the shaft to allow the first interacting portion to move, in response to a force applied by the user, from a first position in which the first interacting portion does not physically interact with the second interacting portion, to a second position in which the first interacting portion physically interacts with the second interacting portion; and where the physical interaction between the first interacting portion and the second interacting portion generates a feedback signal to the user that excessive pressure is being applied.

According to an aspect is a personal care device configured to generate a feedback signal in response to excessive pressure applied by a user. The device includes: (i) a body portion comprising a first interacting portion, and further comprising a drivetrain; and (ii) a shaft comprising a second interacting portion, wherein the drivetrain is configured to oscillate the shaft at a first frequency during use of the personal care device; where at least a portion of the drivetrain is flexible to allow the first interacting portion to move, in response to a force applied by the user, from a first position in which the first interacting portion does not physically impact the second interacting portion, to a second position in which the first interacting portion physically interacts with the second interacting portion at each oscillation of the shaft; and where each physical interaction between the first interacting portion and the second interacting portion generates a feedback signal to the user that excessive pressure is being applied.

According to an embodiment, the drivetrain comprises a flexible attachment mechanism connecting the drivetrain to the body portion such that the drivetrain is flexible to move relative to the body portion.

According to an embodiment, the device further includes a sensor configured to detect the physical interaction between the first interacting portion and the second interacting portion, and further configured to activate a feedback signal, in response to the detection of the physical interaction, to the user that excessive pressure is being applied. According to an embodiment, the sensor is an accelerometer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a personal care device comprising a sensor and/or structure configured to provide feedback to a user. More generally, Applicant has recognized and appreciated that it would be beneficial to provide a personal care device that alerts a user to excessive pressure applied during a cleaning session. Accordingly, the systems described or otherwise envisioned herein provide a personal care device, such as an electric toothbrush or shaver, with a sensor and/or structure configured to provide feedback alerting a user to an excessive pressure condition. According to an embodiment, the personal care device is configured such that at least a portion of the device is flexible in a predetermined magnitude and direction such that when a force is applied to the device, a first portion of the device physically interacts with a second portion of the device to create a feedback alert. For example, a portion of the head member may interact with a portion of the body to create feedback. According to an embodiment, the personal care device may utilize existing sensors to detect excessive pressure Referring to FIG. 1, in one embodiment, a personal care device is provided. The personal care device is a personal care device 10 that includes a body portion 12 with a housing and a head member 14 mounted on the body portion. Head member 14 is mounted so as to be able to move relative to the body 12. The movement can be any of a variety of different movements, including vibrations or rotation, among others. The head member 14 can be fixedly mounted onto body portion 12, or it may alternatively be detachably mounted so that head member 14 can be replaced with a new one when components of the device are worn out and require replacement.

Figure 1:
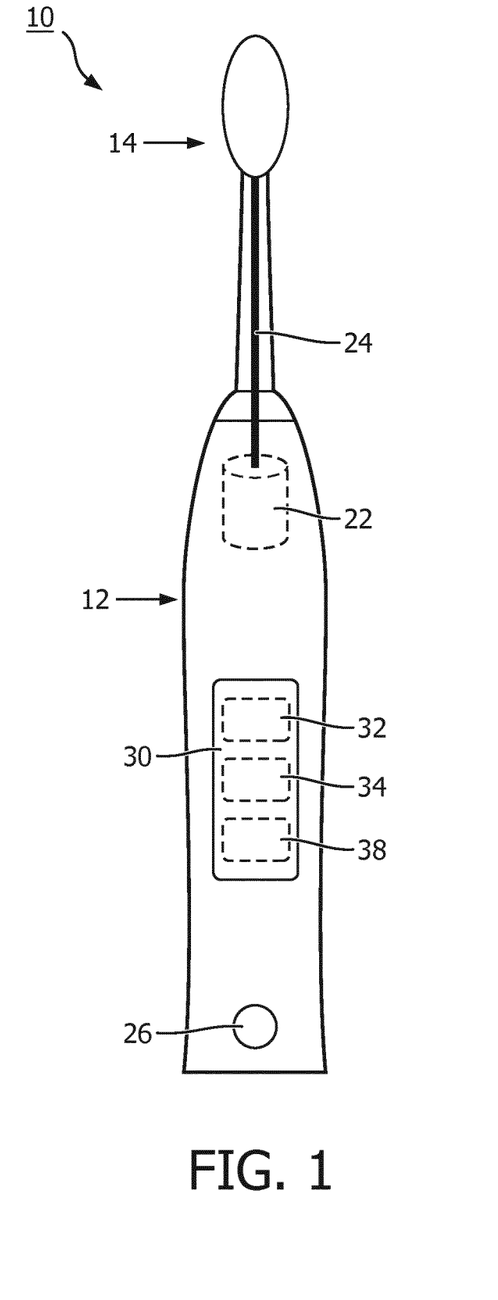
FIG. 1 is a schematic representation of a personal care device, in accordance with an embodiment.

The body portion includes a drivetrain 22 with a motor for generating movement and a transmission component 24, or shaft, for transmitting the generated movements to head member 14. For example, drivetrain 22 comprises a motor or electromagnet(s) that generates movement of a drivetrain shaft 24, which is subsequently transmitted to the head member 14. Drivetrain and motor 22 can include components such as a power supply, an oscillator, and one or more electromagnets, among other components. In this embodiment the power supply comprises one or more rechargeable batteries, not shown, which can, for example, be electrically charged in a charging holder in which personal care device 10 is placed when not in use.

The body portion is further provided with a user input 26 to activate and de-activate the drivetrain 22. The user input 26 allows a user to operate the device 10, for example to turn the device 10 on and off. The user input 26 may, for example, be a button, touch screen, or switch.

The body portion of the device may also, in some embodiments, comprise a controller 30. Controller 30 may be formed of one or multiple modules, and is configured to operate the personal care device 10 in response to an input, such as input obtained via user input 26. Controller 30 can comprise, for example, a processor 32 and a memory 34, and can optionally include a connectivity module 38. The processor 32 may take any suitable form, including but not limited to a microcontroller, multiple microcontrollers, circuitry, a single processor, or plural processors. The memory 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of personal care device 10. According to an embodiment, connectivity module 38 transmits data, and can be any module, device, or means capable of transmitting a wired or wireless signal, including but not limited to a Wi-Fi, Bluetooth, near field communication, and/or cellular module.

Although the figures herein show an electric toothbrush, this is for illustrative purposes only, and it should be recognized that any of the systems described or otherwise envisioned herein may be applied to any personal care cleaning device such as a shaver, flosser, face cleaner, or other personal care device.

Figure 2A:
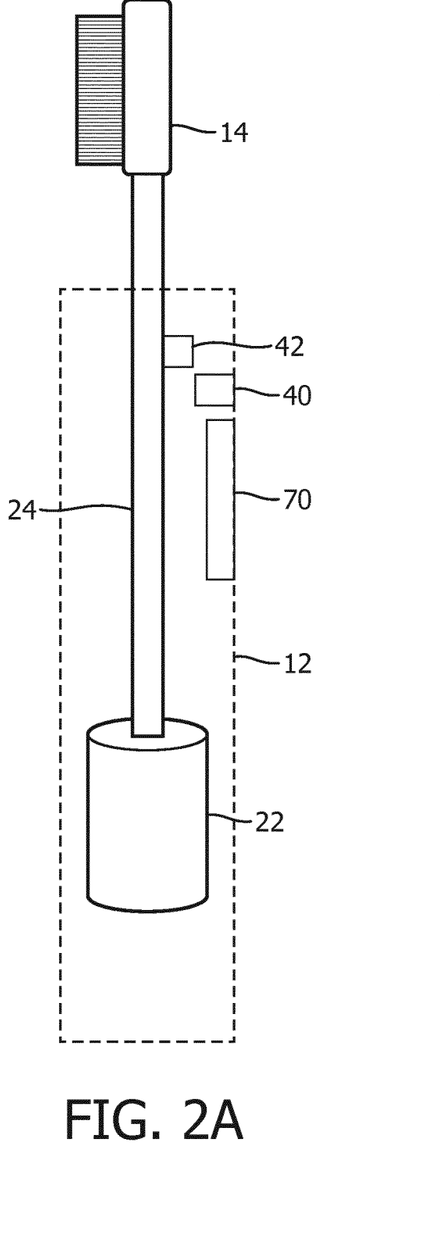
FIG. 2A is a schematic representation of a personal care device configured to generate feedback in response to excessive pressure, in accordance with an embodiment.

Referring to FIG. 2A, in one embodiment, is a portion of a personal care device 10. The personal care device comprises a body portion 12 with a housing and a head member 14 mounted on the body portion. The personal care device also comprises a drivetrain 22 with a motor for generating movement and a transmission component 24, or shaft, for transmitting the generated movements to head member 14. Personal care device 10 further comprises sensor 70, which can be an accelerometer, gyroscope, or other similar motion sensor that is configured to detect an excessive pressure situation. For example, an electronic device may comprise an accelerometer that could be utilized for this purpose.

Figure 2B:
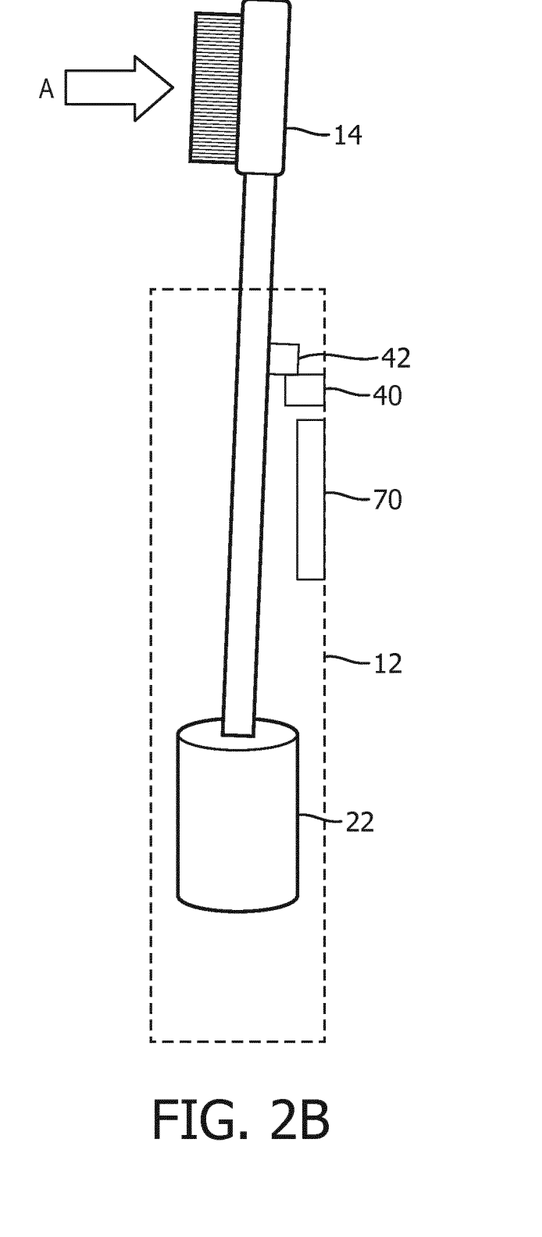
FIG. 2B is a schematic representation of a personal care device configured to generate feedback in response to excessive pressure, in accordance with an embodiment.

According to an embodiment, shaft 24 is mounted relative to drivetrain 22 such that when a force is applied to the head member 14, such as the force represented by arrow A in FIG. 2B, the shaft 24 and/or head 14 moves in the direction of the force. For example, the force represented by arrow A may be applied during a cleaning session as the user, holding the handle, pushes the head member toward the portion of the user's body being cared for. According to another embodiment, drivetrain 22 is mounted within the body portion such that the drivetrain 22, the shaft 24, and the head member 14 moves in the direction of the force. Referring to FIG. 2B, for example, is the personal care device 10 of FIG. 2A in which a force has deflected the shaft 24 and/or head member 14 in the direction of arrow A.

According to an embodiment, body portion 12 comprises a first interacting portion 40 extending into the interior of the body portion 12. Although shown attached to the outer housing in FIG. 2, it should be recognized that the first interacting portion 40 could be an integral component of or attached to any internal structure or region of the body portion 12. Similarly, shaft 24 and/or head member 14 comprises a second interacting portion 42 extending into the interior of the body portion 12. In FIG. 2A, first interacting portion 40 and second interacting portion 42 are separated by a space and thus do not physically interact. In contrast, as shown in FIG. 2B, when a force is applied to the head member, the shaft 24 and/or head member 14 moves in the direction of the force, and second interacting portion 42 moves with the shaft 24 and/or head member 14 in the direction of the force toward first interacting portion 40. Accordingly, first interacting portion 40 and second interacting portion 42 can directly physically interact when an excessive pressure is applied. For example, each oscillation of the shaft and/or head member 14 would cause the first interacting portion 40 to impact the second interacting portion 42. According to an embodiment the excessive pressure value is at or around 300 g force loading, although many other values are possible depending on the goals and design of the personal care device.

When the haptic condition is created by excessive pressure, each oscillation of the device results in one or more impacts. The sensor 70 and/or a processor 30 receiving information from the sensor 70 can identify the impacts as indicating an excessive pressure condition. For example, an accelerometer may detect each impact and determine that a particular threshold or pattern of impacts indicates the excessive pressure condition. According to an embodiment, the system may be designed to screen out other changes in acceleration since the impacts will occur at the drive frequency. When the excessive pressure condition is detected, the sensor 70, controller 30, and/or processor 32 can activate an alert such as an LED warning light or haptic feedback.

Figure 3A:
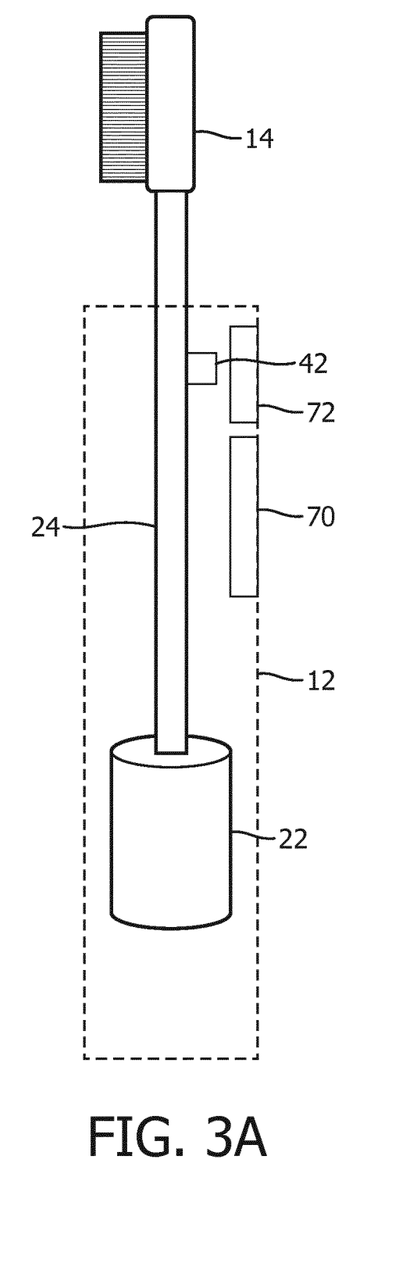
FIG. 3A is a schematic representation of a personal care device configured to generate feedback in response to excessive pressure, in accordance with an embodiment.

Referring to FIG. 3A, in one embodiment, is a portion of a personal care device 10. The personal care device comprises a body portion 12 with a housing and a head member 14 mounted on the body portion. The personal care device also comprises a drivetrain 22 with a motor for generating movement and a transmission component 24, or shaft, for transmitting the generated movements to head member 14.

Figure 3B:
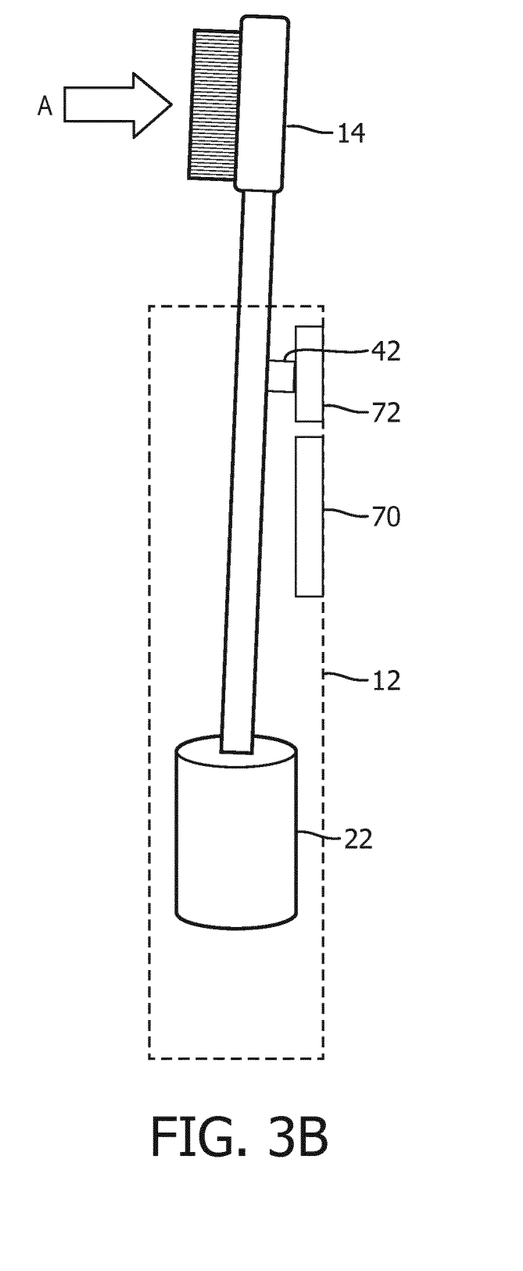
FIG. 3B is a schematic representation of a personal care device configured to generate feedback in response to excessive pressure, in accordance with an embodiment.

According to an embodiment, shaft 24 is mounted relative to drivetrain 22 and/or housing such that when a force is applied to the head member 14, such as the force represented by arrow A in FIG. 3B, the shaft 24 and/or head member 14 moves in the direction of the force. For example, the force represented by arrow A may be applied during a cleaning session as the user, holding the handle, pushes the head member toward the body portion being cared for.

In this embodiment, the sensor 70 detects accelerations or other motion data during normal operation of the personal care device 10. When the user applies excessive force, the accelerations or other motion data obtained by sensor 70 will change. For example, the oscillation amplitude and/or frequency may decrease as the user applies excessive force, and the sensor 70 will detect the decrease in oscillation amplitude and/or frequency and interpret it as excessive pressure. The sensor and/or processor may compare the amplitude and/or frequency or other sensor data to a threshold or other metric that allows the device to quantify the amount of pressure based on the sensor data.

According to one embodiment, the personal care device comprises a pad 72 or other component on the shaft, handle, or other element of the device that can receive the excessive force without damaging the device. For example, as shown in FIG. 3B, excessive force has pushed the shaft 24 and/or head member 14 such that the second interacting portion 42 interacts with the pad 72 to receive some of the force (although the positions may be reversed and a pad 72 may interact with a first interaction portion 40). This will also affect the oscillation amplitude and/or frequency or other sensor data, which the sensor will interpret as excessive pressure.

Figure 4A:
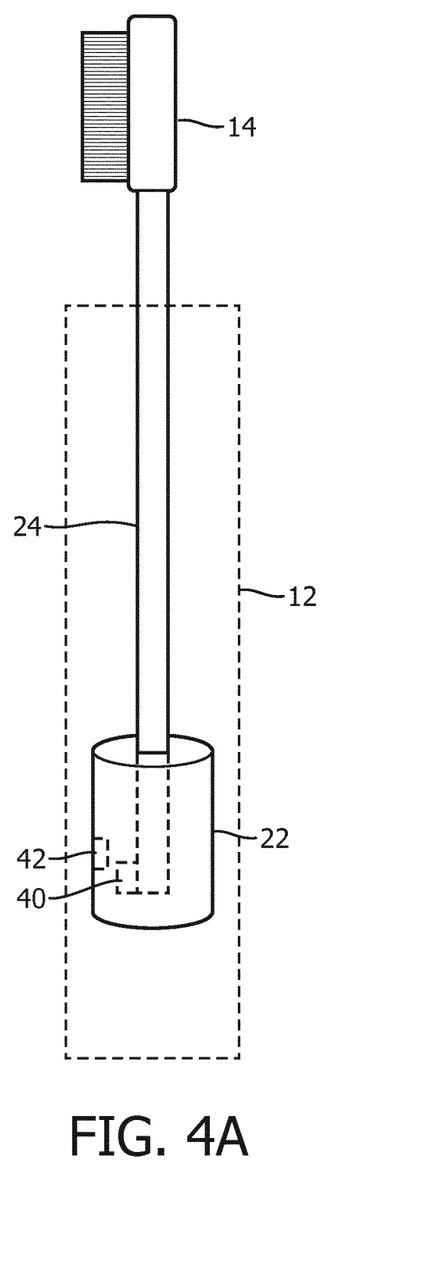
FIG. 4A is a schematic representation of a personal care device configured to generate feedback in response to excessive pressure, in accordance with an embodiment.

Referring to FIG. 4A, in one embodiment, is a portion of a personal care device 10. The personal care device comprises a body portion 12 with a housing and a head member 14 mounted on the body portion. In this embodiment, the shaft 24 is mounted so as to be able to move relative to both the body portion 12 and the drivetrain 22. For example, according to an embodiment, shaft 24 is mounted within the drivetrain 22 such that when a force is applied to the head member 14, such as the force represented by arrow A in FIG. 4B, the shaft moves relative to the housing and the drivetrain 22. For example, the shaft may be mounted at its end within the drivetrain such that the shaft can pivot. The force represented by arrow A may be applied during a cleaning session as the user, holding the handle, pushes the head member toward the portion of the body being cared for, causing the shaft to move.

Figure 4B:
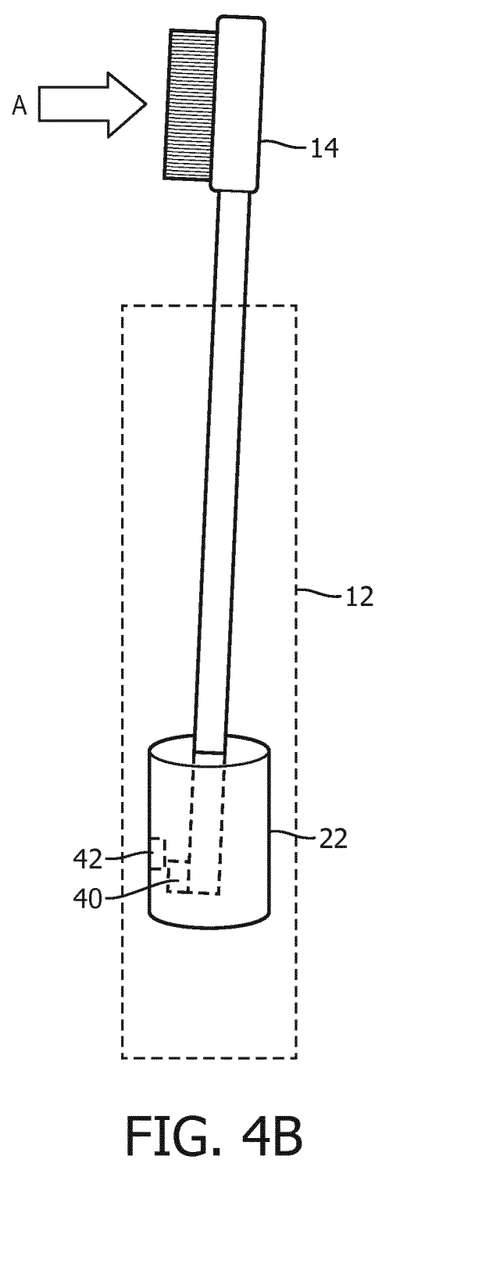
FIG. 4B is a schematic representation of a personal care device configured to generate feedback in response to excessive pressure, in accordance with an embodiment.

In this embodiment, the first and second interacting portions are located within the drivetrain 22, with the second interacting portion 42 connected to or extending from the shaft, and the first interaction portion 40 connected to or extending from the drivetrain or a portion of the drivetrain. As the shaft 24 moves, the second interacting portion 42 of the shaft moves with the shaft 24 in the direction of the force toward first interacting portion 40. Accordingly, first interacting portion 40 and second interacting portion 42 can directly physically interact when an excessive pressure is applied. This physical interaction produces a haptic and/or audible alert that informs the user that there is excessive pressure.

According to an embodiment, the physical interaction between first interacting portion 40 and second interacting portion 42 can generate a haptic and/or audible alert that informs the user that there is excessive pressure. The haptic and/or audible alert may be generated by rubbing of a surface of the first interacting portion 40 against a surface of the second interacting portion 42. The surfaces may be textured to generate a haptic and/or audible alert with a certain predetermined quality. For example, one or both of the surfaces may be ribbed or otherwise textured to generate a haptic alert with a certain predetermined frequency.

Figure 5:
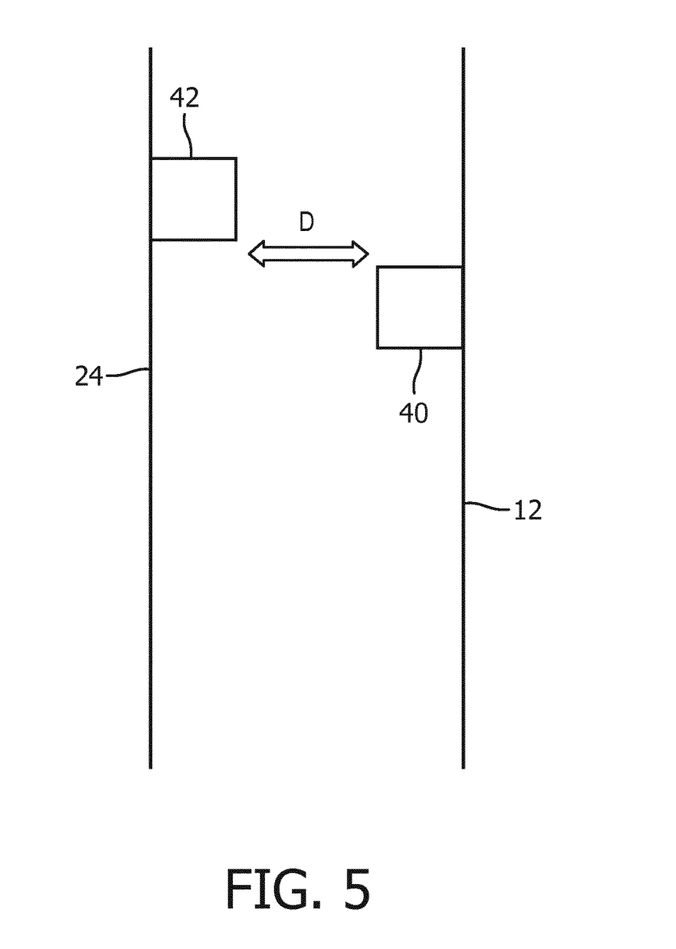
FIG. 5 is a schematic representation of a portion of a personal care device configured to generate feedback in response to excessive pressure, in accordance with an embodiment.

The distance between the first interacting portion 40 and second interacting portion 42 is designed to allow for normal pressure to be applied by the user, while alerting the user to excessive pressure above a predetermined threshold. Referring to FIG. 5, in one embodiment, is a section of the personal care device of one or more of the previous figures. As shown in FIG. 5, the first interacting portion 40 and second interacting portion 42 are separated by a distance "D" unless an excessive pressure situation is encountered. Distance D is designed such that a user is notified of excessive pressure only if the amount of pressure applied meets or exceeds a predetermined threshold. Accordingly, distance D can be adjusted to modify the amount of pressure needed for an excessive pressure notification. For example, shortening distance D reduces the amount of force needed for an excessive pressure notification. Similarly, lengthening distance D increases the amount of force needed for an excessive pressure notification.

Additionally or alternatively, the movement of shaft 24 can be modified to allow for normal pressure to be applied by the user, while alerting the user to excessive pressure above a predetermined threshold. Adjusting the ease with which shaft 24 moves adjusts the amount of force needed to elicit an excessive pressure alert. For example, a less movement will increase the amount of force needed for an excessive pressure notification, while more movement will decrease the amount of force needed for an excessive pressure notification.

Figure 6A:
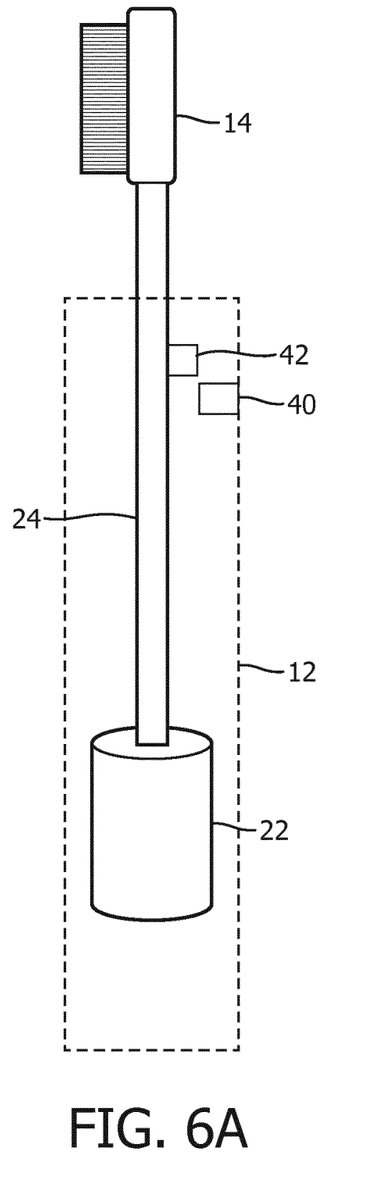
FIG. 6A is a schematic representation of a personal care device configured to generate feedback in response to excessive pressure, in accordance with an embodiment.

Referring to FIG. 6A, in one embodiment, is a portion of a personal care device 10. The personal care device comprises a body portion 12 with a housing and a head member 14 mounted on the body portion. In this embodiment, the drivetrain 22 is configured or designed to be flexible to allow the shaft 24 to move relative to the housing. When a force is applied to the head member 14, such as the force represented by arrow A in FIG. 6B, all or a portion of the drivetrain 22 flexes, which allows the shaft 24 and/or head member 14 to move in the direction of the force.

Figure 6B:
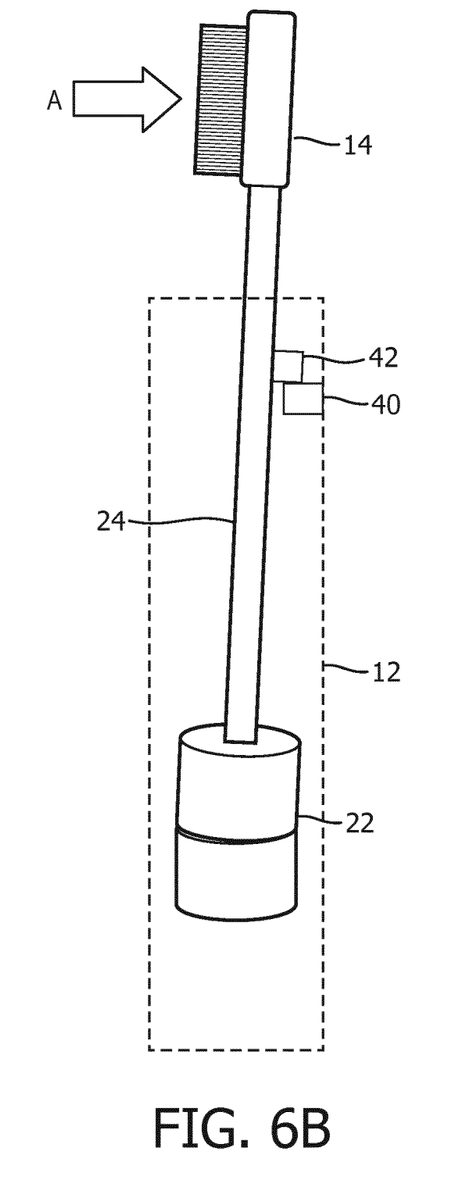
FIG. 6B is a schematic representation of a personal care device configured to generate feedback in response to excessive pressure, in accordance with an embodiment.

According to an embodiment, shaft 24 and/or head member 14 comprises a second interacting portion 42 and body portion 12 comprises a first interacting portion 40. When force is applied to the head member 14, all or a portion of the drivetrain 22 flexes and the shaft 24 and/or head member 14 can move in the direction of the force, and the first interacting portion 40 and the second interacting portion 42 can interact to indicate an excessive pressure condition. An excessive pressure alert may be provided mechanically via a haptic and/or audible feedback mechanism, and/or may be provided via a sensor that detects the interaction of the first interacting portion 40 and the second interacting portion 42 and activates corresponding feedback.

Figure 7A:
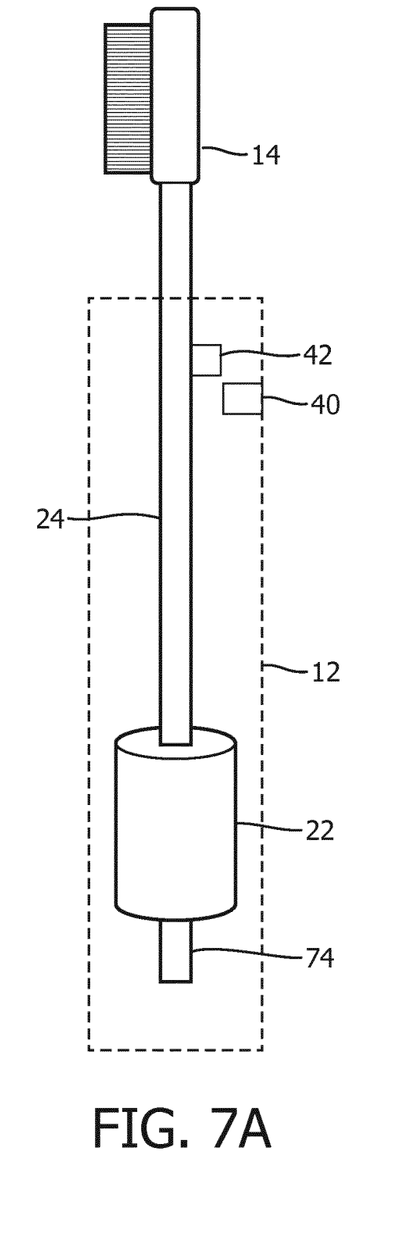
FIG. 7A is a schematic representation of a personal care device configured to generate feedback in response to excessive pressure, in accordance with an embodiment.

Referring to FIG. 7A, in one embodiment, is a portion of a personal care device 10. The personal care device comprises a body portion 12 with a housing and a head member 14 mounted on the body portion. In this embodiment, the drivetrain 22 is mounted to the housing or within the handle via a flexible attachment mechanism 74. The flexible attachment mechanism 74 may be a spring, flexible shaft, or any other connection configured to allow flexure as described or otherwise envisioned herein. When a force is applied to the head member 14, such as the force represented by arrow A in FIG. 7B, flexible attachment mechanism 74 flexes, which allows the drivetrain, shaft 24, and head member 14 to move in the direction of the force.

Figure 7B:
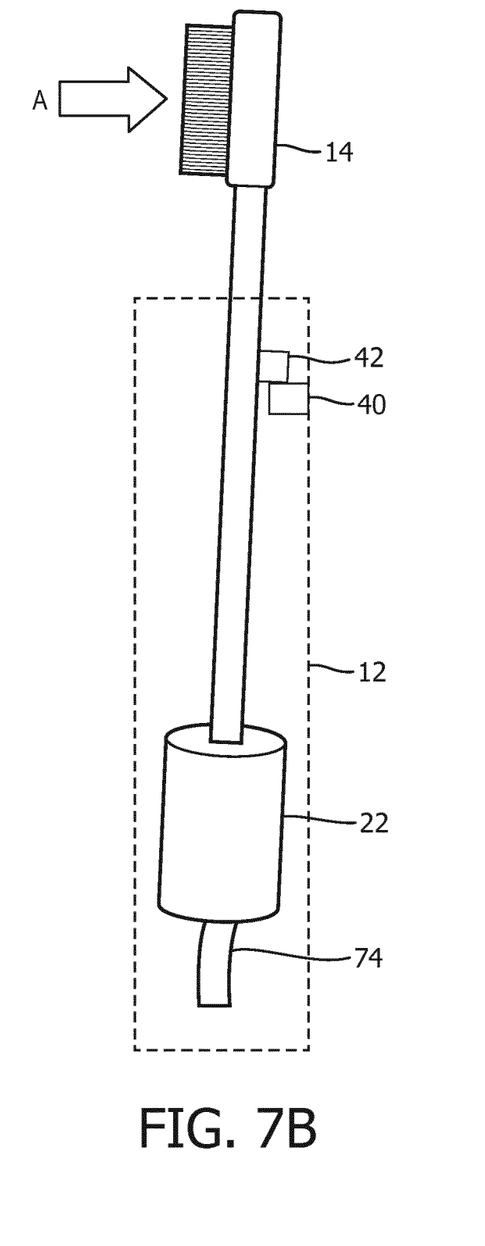
FIG. 7B is a schematic representation of a personal care device configured to generate feedback in response to excessive pressure, in accordance with an embodiment.

According to an embodiment, shaft 24 and/or head member 14 comprises a second interacting portion 42 and body portion 12 comprises a first interacting portion 40. When force is applied to the head member 14, flexible attachment mechanism 74 flexes and the drivetrain, shaft 24, and brsh head member 14 to move in the direction of the force. Accordingly, the first interacting portion 40 and the second interacting portion 42 can interact to indicate an excessive pressure condition. An excessive pressure alert may be provided mechanically via a haptic and/or audible feedback mechanism, and/or may be provided via a sensor that detects the interaction of the first interacting portion 40 and the second interacting portion 42 and activates corresponding feedback.

Figure 8A:
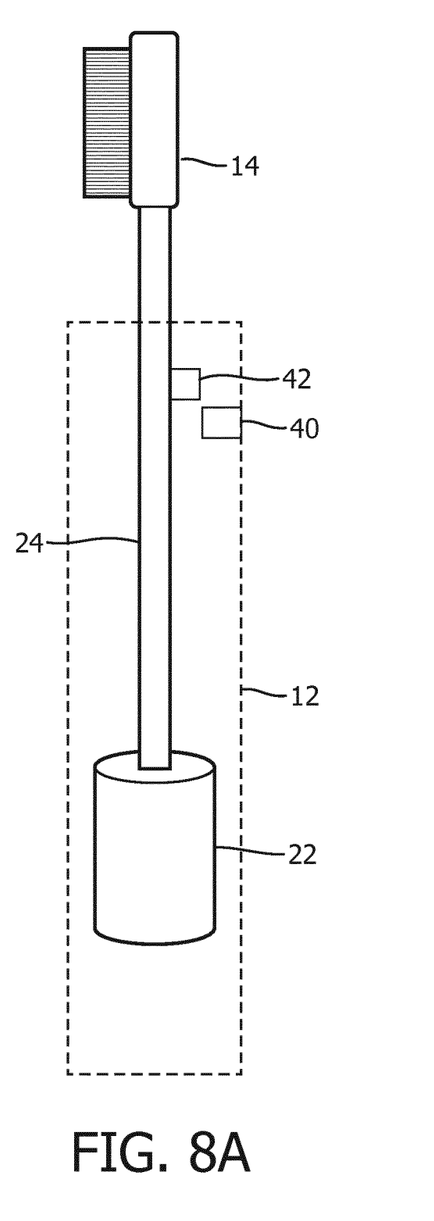
FIG. 8A is a schematic representation of a personal care device configured to generate feedback in response to excessive pressure, in accordance with an embodiment.

Referring to FIG. 8A, in one embodiment, is a portion of a personal care device 10. The personal care device comprises a body portion with a body portion 12 and a head member 14 mounted on the body portion. In this embodiment, all or a portion of the body portion 12 is flexible. When the user holding the handle pushes the handle and the head member against the portion of the user's body being cared for, such as the force indicated by the arrow B in FIG. 8B, all or a portion of the body portion 12 flexes relative to the head member 14. The handle itself may be flexible, or a portion of the handle such as an outer housing may be flexible.

Figure 8B:
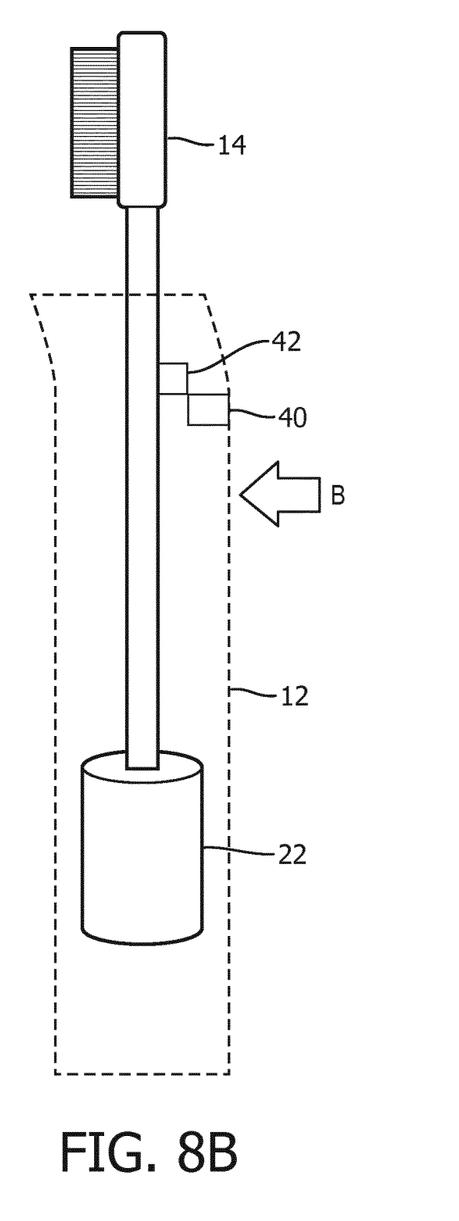
FIG. 8B is a schematic representation of a personal care device configured to generate feedback in response to excessive pressure, in accordance with an embodiment.

According to an embodiment, shaft 24 and/or head member 14 comprises a second interacting portion 42 and the flexible portion of body portion 12 comprises a first interacting portion 40. When the body portion 12 flexes relative to the head member 14 in response to a force, the first interacting portion 40 and the second interacting portion 42 can interact to indicate an excessive pressure condition. An excessive pressure alert may be provided mechanically via a haptic and/or audible feedback mechanism, and/or may be provided via a sensor that detects the interaction of the first interacting portion 40 and the second interacting portion 42 and activates corresponding feedback.

Figure 9A:
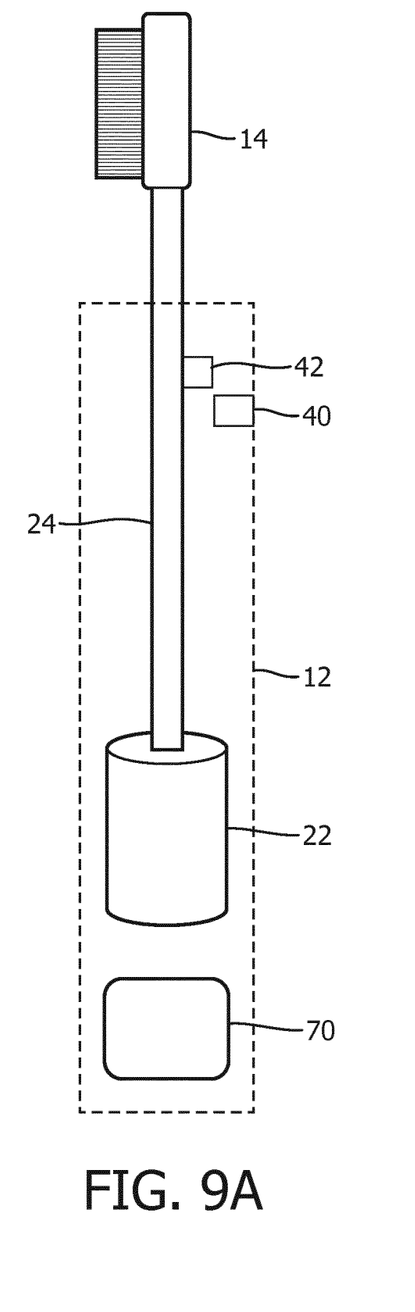
FIG. 9A is a schematic representation of a personal care device configured to generate feedback in response to excessive pressure, in accordance with an embodiment.

Referring to FIG. 9A, in one embodiment, is a personal care device 10 with a body portion or housing and a head member 14 mounted on the body portion. In this embodiment, the personal care device comprises a sensor 70 configured to monitor a current draw of the drive motor of the device. For example, the sensor may be any sensor or processor or component that can detect the current draw of the drive motor. Either the sensor 70 or a processor receiving information from the sensor 70 monitors the current draw of the drive motor.

Figure 9B:
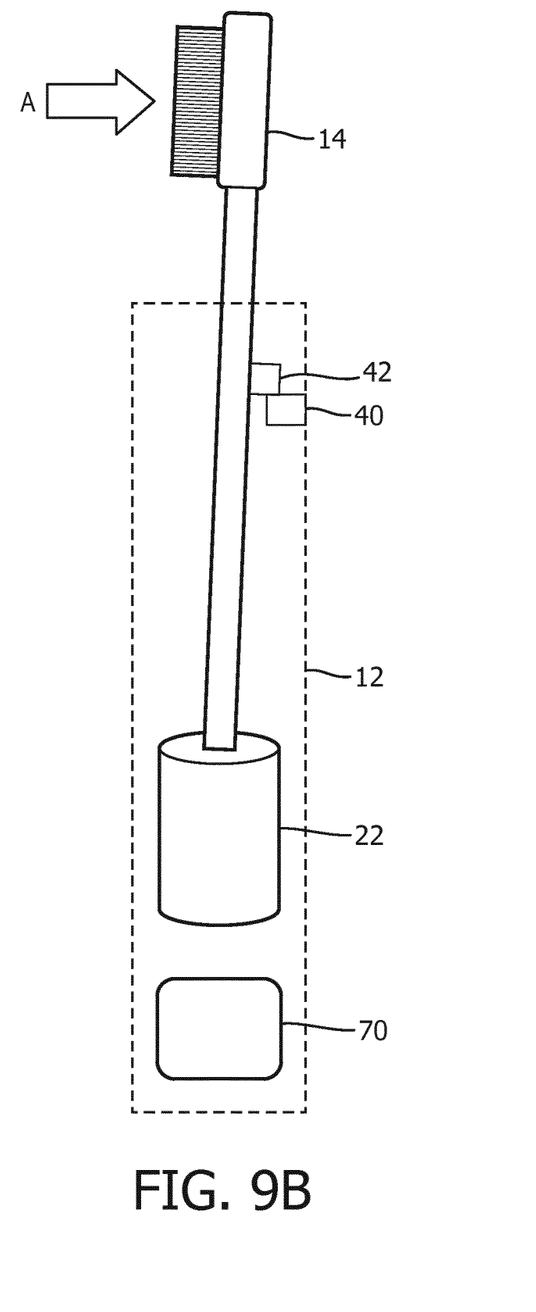
FIG. 9B is a schematic representation of a personal care device configured to generate feedback in response to excessive pressure, in accordance with an embodiment.

In this embodiment, the body portion 12 comprises a first interacting portion 40 extending into the interior of the body portion 12, and shaft 24 and/or head member 14 comprises a second interacting portion 42 extending into the interior of the body portion 12. In FIG. 9A, first interacting portion 40 and second interacting portion 42 are separated by a space and thus do not physically interact. In contrast, as shown in FIG. 9B, when a force is applied against the head member, the shaft 24 and/or head member 14 moves in the direction of the force, and second interacting portion 42 moves with the shaft 24 and/or head member 14 in the direction of the force toward first interacting portion 40. Accordingly, first interacting portion 40 and second interacting portion 42 can directly physically interact when an excessive pressure is applied. When first interacting portion 40 and second interacting portion 42 physically interact, each oscillation of the device results in one or more impacts of the shaft and/or head member into the housing or another component, which in turn causes accompanying periodic spikes in the motor current draw.

According to an embodiment, the sensor 70 and/or a processor receiving information from the sensor 70 can identify the periodic spikes in the motor current draw as indicating an excessive pressure condition. For example, the system may be designed to screen out other changes in current draw since the periodic spikes in the motor current caused by the physical interaction of first interacting portion 40 and second interacting portion 42 will occur at the drive frequency. When the excessive pressure condition is detected, the sensor 70, controller 30, and/or processor 32 can activate an alert such as an LED warning light or haptic feedback.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A personal care device configured to generate a feedback signal in response to excessive pressure applied by a user, the device comprising:
    a body portion comprising a first interacting portion and a drivetrain;
    a transmission shaft comprising a second interacting portion, wherein the transmission shaft and the second interacting portion are moveable, in response to a force applied by the user, from a first position in which the first interacting portion does not physically interact with the second interacting portion, to a second position in which the first interacting portion physically interacts with the second interacting portion; and
    a sensor configured to detect the physical interaction between the first interacting portion and the second interacting portion, and further configured to activate a feedback signal, in response to the detection of the physical interaction, to the user that excessive pressure is being applied,
    wherein the drivetrain is configured to oscillate the transmission shaft, and wherein the sensor is configured to detect a change in the oscillation of the transmission shaft as a result of the physical interaction between the first interacting portion and the second interacting portion, said change in oscillation indicating that excessive pressure is being applied by the user.

2. The personal care device of claim 1, wherein the second interacting portion extends from the transmission shaft into an interior region of the body portion, and wherein the first interacting portion extends into an interior region of the body portion.

3. The personal care device of claim 1, wherein the drivetrain is mounted relative to the body portion to be moveable to move the second interacting portion from the first position to the second position in response to the force applied by the user.

4. The personal care device of claim 3, comprising a flexible attachment mechanism connecting the drivetrain to the body portion such that the drivetrain is moveable relative to the body portion.

5. The personal care device of claim 1, wherein the first interacting portion and the second interacting portion are internal to the drivetrain.

6. The personal care device of claim 1, wherein at least a portion of the body portion is flexible relative to the transmission shaft to allow movement of the first interacting portion from the first position to the second position in response to the force applied by the user.

7. The personal care device of claim 1 wherein the sensor is configured to detect the physical interaction between the first interacting portion and the second interacting portion as a change in current draw by the drivetrain.

8. A personal care device configured to generate a feedback signal in response to excessive pressure applied by a user, the device comprising:
    a body portion comprising a first interacting portion and a drivetrain; and
    a transmission shaft comprising a second interacting portion;
    wherein at least a portion of the body portion is flexible relative to the transmission shaft to allow the first interacting portion to move, in response to a force applied by the user, from a first position in which the first interacting portion does not physically interact with the second interacting portion, to a second position in which the first interacting portion physically interacts with the second interacting portion; and
    wherein the physical interaction between the first interacting portion and the second interacting portion generates a feedback signal to the user,
    wherein the drivetrain is configured to oscillate the transmission shaft, and wherein the feedback signal is responsive to a change in the oscillation of the transmission shaft as a result of the physical interaction between the first interacting portion and the second interacting portion, said change in oscillation indicating that excessive pressure is being applied by the user.

9. The personal care device of claim 8, wherein the second interacting portion extends from the transmission shaft into an interior region of the body portion, and wherein the first interacting portion extends into an interior region of the body portion.

10. A personal care device configured to generate a feedback signal in response to excessive pressure applied by a user, the device comprising:
    a body portion comprising a first interacting portion, and further comprising a drivetrain; and
    a transmission shaft comprising a second interacting portion, wherein the drivetrain is configured to oscillate the transmission shaft at a first frequency during use of the personal care device;
    wherein at least a portion of the drivetrain is flexible to allow the first interacting portion to move, in response to a force applied by the user, from a first position in which the first interacting portion does not physically impact the second interacting portion, to a second position in which the first interacting portion physically interacts with the second interacting portion at each oscillation of the transmission shaft; and
    wherein each physical interaction between the first interacting portion and the second interacting portion generates a feedback signal to the user applied,
    wherein the drivetrain is configured to oscillate the transmission shaft, and wherein the feedback signal is responsive to a change in the oscillation of the transmission shaft as a result of the physical interaction between the first interacting portion and the second interacting portion, said change in oscillation indicating that excessive pressure is being applied by the user.

11. The personal care device of claim 10, wherein the drivetrain comprises a flexible attachment mechanism connecting the drivetrain to the body portion such that the drivetrain is flexible to move relative to the body portion.

12. The personal care device of claim 10, wherein the second interacting portion extends from the transmission shaft into an interior region of the body portion, and wherein the first interacting portion extends into an interior region of the body portion.

13. The personal care device of claim 10, further comprising a sensor configured to detect the physical interaction between the first interacting portion and the second interacting portion, and further configured to activate a feedback signal, in response to the detection of the physical interaction, to the user that excessive pressure is being applied.

14. The personal care device of claim 13, wherein the sensor is an accelerometer.

* * * * *